United States Patent
Miller, Jr. et al.

(10) Patent No.: US 10,482,767 B2
(45) Date of Patent: Nov. 19, 2019

(54) DETECTION OF EXTRA-PLATOON VEHICLE INTERMEDIATE OR ADJACENT TO PLATOON MEMBER VEHICLES

(71) Applicant: Bendix Commercial Vehicle Systems LLC, Elyria, OH (US)

(72) Inventors: T. Stephen Miller, Jr., Elyria, OH (US); Joseph M Macnamara, Ashland, OH (US); Martin Bohley, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 233 days.

(21) Appl. No.: 15/395,251

(22) Filed: Dec. 30, 2016

(65) Prior Publication Data
US 2018/0190119 A1     Jul. 5, 2018

(51) Int. Cl.
*G08G 1/16* (2006.01)
*G08G 1/00* (2006.01)
(Continued)

(52) U.S. Cl.
CPC ............ *G08G 1/166* (2013.01); *B60W 30/00* (2013.01); *G08G 1/22* (2013.01); *G01S 7/003* (2013.01);
(Continued)

(58) Field of Classification Search
CPC ............ B60W 30/00; G01S 2013/9325; G01S 7/003; G08G 1/163; G08G 1/166; G08G 1/22
(Continued)

(56) References Cited

U.S. PATENT DOCUMENTS 5,777,451 A * 7/1998 Kobayashi ............. B61L 23/34
                                                              180/169
6,032,097 A * 2/2000 Iihoshi ..................... G08G 1/22
                                                               701/96
(Continued)

FOREIGN PATENT DOCUMENTS

CN      103395419 B     2/2016
DE   10200702487 A1    12/2008
(Continued)

OTHER PUBLICATIONS

Jian Wang, et al., "SAV4AV: securing authentication and verification for ad hoc vehicles", Security and Communication Networks, (2015); 8:626-636.
(Continued)

*Primary Examiner* — Angelina Shudy
(74) *Attorney, Agent, or Firm* — Tucker Ellis LLP; Michael Hudzinski

(57) ABSTRACT

A platoon management control system and method for local detection and determination of a non-platooning vehicle inserted or otherwise disposed between and/or adjacent to one or more platooning vehicle(s). A platooning vehicle determines a forward physical distance between itself and a vehicle physically ahead, and compares the determined physical distance with a value of a rearward distance to the platooning vehicle received from a next ahead platooning vehicle. The vehicle physically ahead is determined to be the next ahead platooning vehicle in accordance with a correspondence between the determined physical distance and the received value of the rearward distance. Conversely, the vehicle physically ahead is determined to be a non-platooning vehicle in accordance with a mis-correspondence between the determined physical distance and the received value of the rearward distance.

20 Claims, 9 Drawing Sheets

(51) Int. Cl.
*B60W 30/00* (2006.01)
*G01S 7/00* (2006.01)
*G01S 13/93* (2006.01)

(52) U.S. Cl.
CPC ...... *G01S 2013/9325* (2013.01); *G08G 1/163* (2013.01)

(58) Field of Classification Search
USPC .............................. 701/93, 94, 96, 300, 301
See application file for complete search history.

(56) References Cited

U.S. PATENT DOCUMENTS

| | | | |
|---|---|---|---|
| 6,223,117 B1 | 4/2001 | Labuhn | |
| 6,356,189 B1 | 3/2002 | Fujimaki | |
| 6,356,820 B1 | 3/2002 | Hashimoto | |
| 6,437,688 B1 | 8/2002 | Kobayashi | |
| 6,539,382 B1* | 3/2003 | Byrne | G06F 12/0862 707/694 |
| 8,020,105 B1* | 9/2011 | Lemay | H04M 1/72552 709/227 |
| 8,352,111 B2* | 1/2013 | Mudalige | G08G 1/22 340/435 |
| 8,660,779 B2 | 2/2014 | Shida | |
| 8,717,192 B2 | 5/2014 | Durekovic | |
| 8,744,666 B2 | 6/2014 | Switkes | |
| 8,762,042 B2 | 6/2014 | Funabashi | |
| 8,855,835 B2 | 10/2014 | Kumabe | |
| 8,924,122 B2 | 12/2014 | Shida | |
| 8,948,995 B2* | 2/2015 | Pandita | B60W 30/17 180/168 |
| 9,141,112 B1 | 9/2015 | Loo | |
| 9,165,470 B2* | 10/2015 | Mudalige | G08G 1/22 |
| 9,272,711 B1 | 3/2016 | Sivaraman | |
| 9,396,661 B2* | 7/2016 | Okamoto | G08G 1/22 |
| 9,494,944 B2* | 11/2016 | Alam | B60W 30/16 |
| 9,632,507 B1* | 4/2017 | Korn | G05D 1/0293 |
| 9,931,976 B1* | 4/2018 | Terwilliger | B60Q 1/26 |
| 9,940,840 B1* | 4/2018 | Schubert | G08G 1/22 |
| 10,068,485 B2* | 9/2018 | Dudar | B60W 30/165 |
| 10,073,464 B2* | 9/2018 | Pilkington | G05D 1/0295 |
| 10,262,537 B1* | 4/2019 | Kim | G08G 1/143 |
| 10,336,253 B1* | 7/2019 | Hsu | B60Q 9/008 |
| 2002/0059017 A1* | 5/2002 | Yamane | G08G 1/0104 701/1 |
| 2003/0054810 A1* | 3/2003 | Chen | H04L 29/06 455/422.1 |
| 2005/0021745 A1* | 1/2005 | Bookman | G06F 17/2258 709/224 |
| 2006/0218630 A1* | 9/2006 | Pearson | G06F 21/41 726/8 |
| 2008/0059007 A1* | 3/2008 | Whittaker | G05D 1/0274 701/2 |
| 2008/0168072 A1* | 7/2008 | Freedman | G06F 17/30581 |
| 2008/0183639 A1* | 7/2008 | DiSalvo | G06Q 40/02 705/36 R |
| 2010/0223467 A1* | 9/2010 | Dismore | G06F 17/30893 713/168 |
| 2010/0256836 A1* | 10/2010 | Mudalige | G08G 1/163 701/2 |
| 2010/0256852 A1* | 10/2010 | Mudalige | G08G 1/163 701/24 |
| 2011/0270513 A1 | 11/2011 | Shida | |
| 2012/0086582 A1* | 4/2012 | Durekovic | G08G 1/161 340/903 |
| 2013/0030687 A1 | 1/2013 | Shida | |
| 2013/0041567 A1* | 2/2013 | Yamashiro | B60T 7/22 701/96 |
| 2013/0080041 A1* | 3/2013 | Kumabe | G05D 1/024 701/117 |
| 2013/0124064 A1* | 5/2013 | Nemoto | B60K 31/0058 701/96 |
| 2013/0211624 A1 | 8/2013 | Lind | |
| 2014/0005906 A1* | 1/2014 | Pandita | B60W 30/17 701/96 |
| 2014/0100734 A1* | 4/2014 | Yamashiro | G08G 1/22 701/23 |
| 2014/0107867 A1* | 4/2014 | Yamashiro | G08G 1/22 701/2 |
| 2014/0136095 A1* | 5/2014 | Isogai | G01S 15/931 701/300 |
| 2014/0172265 A1* | 6/2014 | Funabashi | G08G 1/22 701/96 |
| 2014/0302774 A1 | 10/2014 | Burke | |
| 2014/0316671 A1* | 10/2014 | Okamoto | G08G 1/22 701/96 |
| 2014/0316865 A1* | 10/2014 | Okamoto | G08G 1/22 705/14.1 |
| 2015/0153733 A1* | 6/2015 | Ohmura | B60K 28/06 701/23 |
| 2015/0154871 A1* | 6/2015 | Rothoff | G08G 1/22 701/2 |
| 2015/0269845 A1* | 9/2015 | Calmettes | G08G 1/22 701/300 |
| 2016/0009280 A1* | 1/2016 | Tokimasa | B60W 30/16 701/96 |
| 2016/0009283 A1* | 1/2016 | Tokimasa | B60W 30/16 701/96 |
| 2016/0009284 A1* | 1/2016 | Tokimasa | G01S 13/08 701/96 |
| 2016/0026187 A1* | 1/2016 | Alam | B60W 30/16 701/23 |
| 2016/0054735 A1 | 2/2016 | Switkes | |
| 2016/0163200 A1* | 6/2016 | He | G08G 1/22 701/117 |
| 2016/0171894 A1* | 6/2016 | Harvey | G05D 1/0088 701/23 |
| 2016/0357187 A1* | 12/2016 | Ansari | G01S 15/931 |
| 2016/0357262 A1* | 12/2016 | Ansari | G06F 3/017 |
| 2016/0358477 A1* | 12/2016 | Ansari | G08G 1/167 |
| 2017/0011633 A1* | 1/2017 | Boegel | G05D 1/0293 |
| 2017/0249844 A1 | 8/2017 | Perkins | |
| 2017/0308097 A1* | 10/2017 | Switkes | G08G 1/22 |
| 2017/0344023 A1* | 11/2017 | Laubinger | G05D 1/0272 |
| 2018/0074513 A9* | 3/2018 | Harvey | G05D 1/0297 |
| 2018/0082590 A1* | 3/2018 | MacNeille | G08G 1/0133 |
| 2018/0111611 A1* | 4/2018 | MacNeille | B60W 10/04 |
| 2018/0188745 A1* | 7/2018 | Pilkington | G05D 1/0295 |
| 2018/0188746 A1* | 7/2018 | Lesher | G05D 1/0295 |
| 2018/0211546 A1* | 7/2018 | Smartt | G05D 1/0088 |
| 2018/0253976 A1* | 9/2018 | Inam | H04W 4/046 |
| 2019/0196501 A1* | 6/2019 | Lesher | B60T 8/172 |

FOREIGN PATENT DOCUMENTS

| | | |
|---|---|---|
| DE | 102007024877 A1 | 12/2008 |
| DE | 102012212339 A1 | 1/2014 |
| EP | 2390858 A1 | 11/2011 |
| JP | 2015022420 A | 2/2015 |
| JP | 2015022422 A | 2/2015 |
| KR | 2016065548 A | 6/2016 |
| WO | 2010004911 A1 | 1/2010 |
| WO | 2013147684 A1 | 10/2013 |
| WO | 2013187834 A1 | 12/2013 |
| WO | 2013187839 A1 | 12/2013 |
| WO | 2014137270 A1 | 9/2014 |
| WO | 2014149042 A1 | 9/2014 |
| WO | 2014149043 A1 | 9/2014 |
| WO | 2014149044 A1 | 9/2014 |
| WO | 2015047174 A1 | 4/2015 |
| WO | 2015047182 A1 | 4/2015 |
| WO | 2016065055 A1 | 4/2016 |

OTHER PUBLICATIONS

Kamali, Maryam, et al., "Formal Verification of Autonomous Vehicle Platooning", Department of Computer Science, University of Liverool, UK, Feb. 5, 2016.

(56) References Cited

OTHER PUBLICATIONS

Companion, "Cooperative dynamic formation of platoons for safe and energy-optimized goods transportation", European Commission, Seventh Framework Programme GA No. 610990, D3.2 Information Model for Platoon Services, Sep. 30, 2015.
Nowakowski, Thompson, et al. "Operational Concepts for Truck Cooperative Adaptive Cruise Control (CACC) Maneuvers", Nov. 15, 2015.
Erik Coelingh, "All Aboard the Robotic Road Train", IEEE, Oct. 26, 2012.
Lockridge, Deborah,"Volvo Invests in Platooning Technology", Truckinginfo, Apr. 27, 2015.
News, "Platooning for safety and efficiency", trucknews.com, www.trucknews.com/transportation/platooning-safety-efficiency/100305-9775/, retrieved Dec. 14, 2016.
Delphi, "Delphi Adaptive Cruise Control", www.delphi.com, DESen110220.
Federal Highway Administration, "The Exploratory Advanced Research Program Recent International Activity in Cooperative Vehicle-Highway Automation Systems Current Asian Activities in Cooperative Vehicle-Highway Automation", Publication No. FHWA-HRT-12-033, Dec. 2012.
Robbert Janssen, et al. "Truck Platooning Driving the Future of Transportation", TNO Innovation for Life, Feb. 2015.
Companion, "Partially Autonomous Driving Trucks on Public Road Near Zwolle", Seventh Framework Programme, Feb. 9, 2015.
U.S. Office Action from related U.S. Appl. No. 15/395,160, dated Oct. 13, 2017.
European Patent Office, International Search Report and Written Opinion corresponding to PCT/US2017/068932, dated Apr. 24, 2018, pp. 1-14.

\* cited by examiner

DETECTION OF EXTRA-PLATOON VEHICLE INTERMEDIATE OR ADJACENT TO PLATOON MEMBER VEHICLES

CROSS REFERENCE TO RELATED APPLICATIONS

This application is related to U.S. application Ser. No. 15/395,160, filed Dec. 30, 2016, entitled: VARYING THE DISTANCE BETWEEN VEHICLES IN A PLATOON; U.S. application Ser. No. 15/395,219, filed Dec. 30, 2016, entitled: SELF-ORDERING OF FLEET VEHICLES IN A PLATOON; and U.S. application Ser. No. 15/395,214, filed Dec. 30, 2016, entitled: "V" SHAPED AND WIDE PLATOON FORMATIONS, the contents of each of these applications being incorporated herein by reference in their entirety.

TECHNICAL FIELD

The embodiments herein relate generally to highway vehicle platoon management. More specifically, particular embodiments relate to commercial highway vehicle platoon management where the detection by a platoon member vehicle of a non-platoon interloper vehicle disposed intermediate two or more of the platooning vehicles or adjacent to one or the platooning vehicles is important for protecting the safety and maintaining the efficiency of the platoon. Although the embodiments will be described with reference to selected particular examples, it is to be appreciated that the claimed invention is also amenable to other applications and can be equivalently extended to other embodiments.

BACKGROUND

It is known that two or more vehicles moving along the roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. More complicated platoons can span two or more roadway lanes but, overall, the goals of providing enhanced efficiency, but more importantly safety, to both the platooned vehicles as well as to the other vehicles on the roadway most usually dictate the single lane platoon incarnation.

The aerodynamic geometry of the vehicles within a platoon is a significant factor used in determining and ordering of the vehicles. As general rule, a physically smaller vehicle following a physically larger vehicle will provide a greater benefit. Since commercial box trucks and tractors towing box trailers are, in general, taller and wider than most flatbed tractor trailer combinations, a maximum aerodynamic benefit and resultant fuel savings is realized by ordering vehicles classified this way such that the commercial box trucks and tractors towing box trailers take the leader position(s) in the platoon, while the flatbed tractor trailer rigs take the follower position(s) in the platoon.

In addition to the above regarding platoon position ordering based on the physical characteristics of the individual vehicles, a small spacing between the properly ordered platooned vehicles gives greater benefit in terms of reduced energy consumption. However, a tight spacing between platooned vehicles requires that careful attention be paid to various functional operational characteristics and capabilities of the vehicles including required stopping distance, acceleration ability, deceleration ability, load and/or cargo size and/or weight, and the like. Special attention must also be paid to characteristics of the roadway such as roadway incline, decline, and turn radii.

In the single lane platoon incarnation described above, the vehicles participating in a platoon typically mutually cooperate to maintain a relatively fixed and constant (even or the same) distance between adjacent vehicles. On flat roadways, the even distance maintained between the vehicles is often fixed and constant in accordance with control protocols using global positioning systems (GPS) data sharing, and safety and efficiency algorithms. On graded roadways, the relatively even distance maintained between the vehicles is often modified to improve or otherwise maintain or enhance the overall safety and efficiency of the platoon. For example, the even distance maintained between the vehicles can be decreased during conditions of the platoon traversing an incline wherein the tendency of the overall platoon is to decrease speed slightly. Conversely, the even distance maintained between the vehicle can be increased during conditions of the platoon traversing a decline wherein the tendency of the overall platoon is to increase speed slightly. In any case, the relative distance between the vehicles of the platoon preferably remains substantially even, constant or the same in accordance with platoon control mechanisms and protocols in place.

In addition to the above, vehicles participating in a platoon typically share their positions with other vehicles of the platoon by communicating their GPS coordinate data with other vehicles using vehicle-to-vehicle (V2V) communications ("V2V Unicast" communications), and/or vehicle-2-vehicles (V2x) communications ("V2V Multicast" communications), and/or any other suitable communications that might be available. One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers, and that definition of the categories should start with differentiating between platooning and ACC, then determining message sets and performance to realize cooperative vehicles.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

Platoons that operate on public roadways, however, must contend with additional factors such as other vehicles. The more complicated platoon incarnations described above admits to the possibility that platoons often operate on multi-lane roadways. This being the situation, vehicles of a platoon must be able to discover or otherwise recognize non-platoon interloper vehicles disposed between two or more of the platooning vehicles so that the efficiency benefits provided by the platoon can be maintained without adversely affecting safety of the platooned vehicles or of the interloper vehicles. Platoons that operate outdoors on public roadways must contend with further facto such as weather conditions that might affect the ability of the vehicles to receive and/or interpret their GPS coordinate data from satellite sources of the like.

The present embodiments provide for a new and improved platoon management control system and method for local detection and determination of a non-platooning vehicle inserted or otherwise disposed between and/or adjacent to one or more platooning vehicle(s).

The systems and methods of the embodiments detect interloper vehicles using vehicle sensing and control processing techniques local to each of the platoon vehicles. In that way, reliance upon the functionality or ability to receive GPS signals as well as reliance upon a remote and/or centralize management control operation is not necessary, resulting in a fast and independent determination and an ability to make correspondingly fast and independent further platooning decisions when an uninvited vehicle inserts itself between a platooning vehicle pair.

The present embodiments provide for new and improved detection of extra-platoon vehicle(s) intermediate or adjacent to platoon member vehicles, for new and improved platoon maintenance with added safety benefits.

SUMMARY OF THE EXAMPLE EMBODIMENTS

The embodiments permit two or more vehicles moving along a roadway to cooperate as a road train or a "platoon" without interference from non-platooning or interloper vehicles for mutual safety and efficiency benefits.

In accordance with one aspect, a platoon management control system and method locally detects and determines a non-platooning vehicle inserted or otherwise disposed between and/or adjacent to one or more platooning vehicle(s).

In accordance with another aspect, a platooning vehicle determines a forward physical distance between itself and a vehicle physically ahead, and compares the determined physical distance with a value of a rearward distance to the platooning vehicle received from a next ahead platooning vehicle.

In accordance with yet another aspect, the vehicle physically ahead is determined to be the next ahead platooning vehicle in accordance with a correspondence between the determined physical distance and the received value of the rearward distance.

In yet another aspect, the vehicle physically ahead is determined to be a non-platooning vehicle in accordance with a mis-correspondence between the determined physical distance and the received value of the rearward distance.

Other embodiments, features and advantages of the example embodiments will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
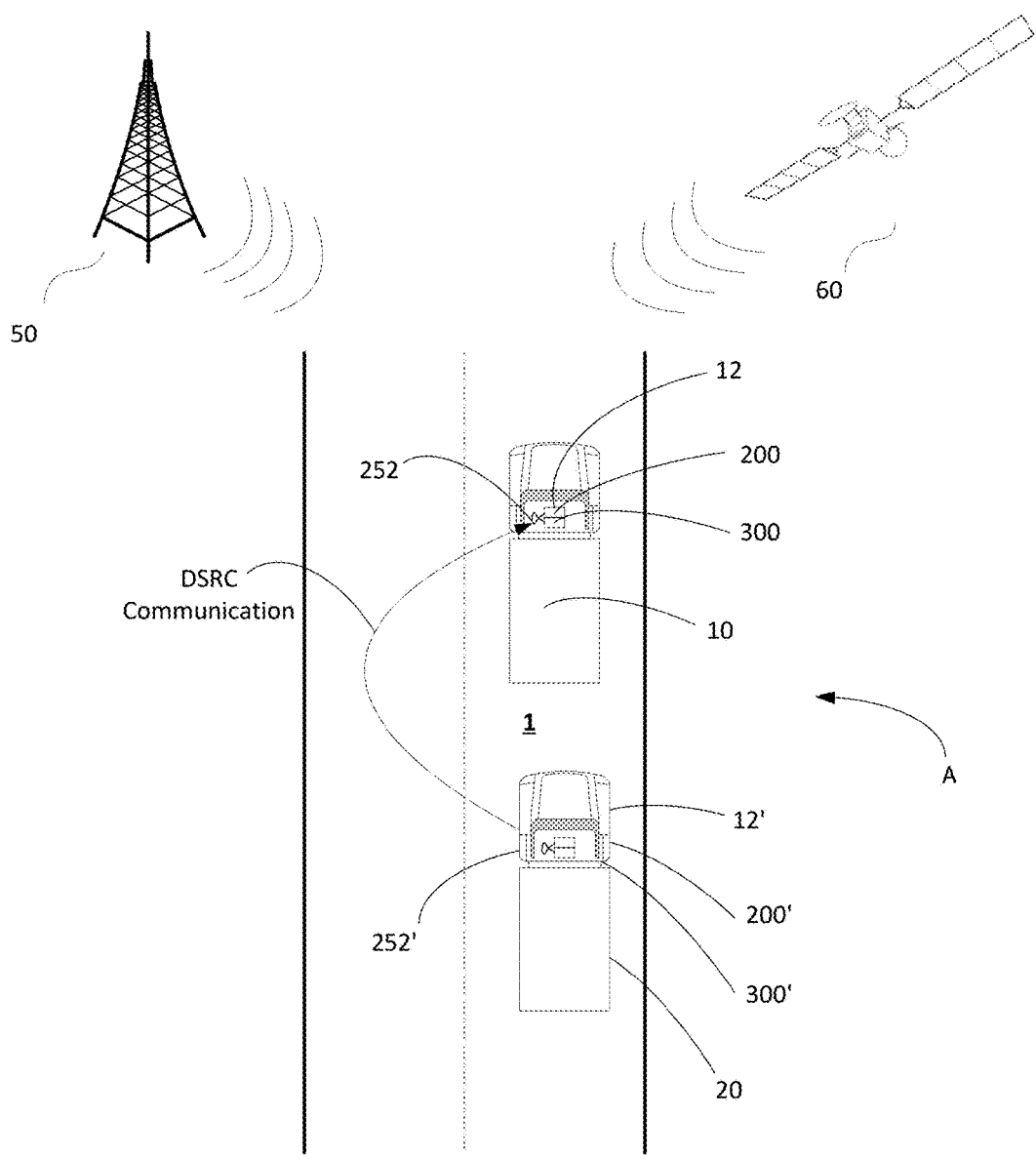
FIG. 1 depicts operation of an exemplary platoon in accordance with an embodiment.

Referring now to the drawings, wherein the showings are for the purpose of illustrating the example embodiments only, and not for purposes of limiting the same, FIG. 1 illustrates a basic platoon P including a host or leader vehicle 10 in traffic with a second or follower vehicle 20 in accordance with the present disclosure. As shown, the follower vehicle 20 is traveling proximate to the leader vehicle 10 in an ordered platoon P along a roadway 1. The leader vehicle 10 is provided with an electronic control system 12 which includes a data collection and communication module portion 200 and a platooning control portion 300 to be described in greater detail below. Similarly, the follower vehicle 20 is also provided with an electronic control system 12' which includes a data collection and communication module portion 200' and a platooning control portion 300'. In the example embodiments to be described herein, each of the two or more vehicles comprising the various platoons that will be described include the same or equivalent electronic control system 12, the same or equivalent data collection and communication module portion 200, and the same or equivalent platooning control portion 300, although other control systems having the functionality to be described herein may equivalently be used as necessary or desired.

In the example embodiment illustrated, the electronic control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential, wherein the embodiments herein are directed primarily to vehicle self-ordering i.e. platoon ordering beneficially without the need to consult with or act under the direction of or in concert with the remote wireless communication system 50, the remote satellite system 60, the remote fleet management facility, or the like.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon P can communicate with each other locally for self-ordering into a platoon without the need for input from the NOC in accordance with the embodiments herein. The vehicles forming the basic platoon P can also communicate with one or more other vehicles locally without the need for input from the NOC for negotiating the one or more other vehicles into the platoon in accordance with the embodiments herein. The vehicles forming the basic platoon P can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are Platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Figure 2:
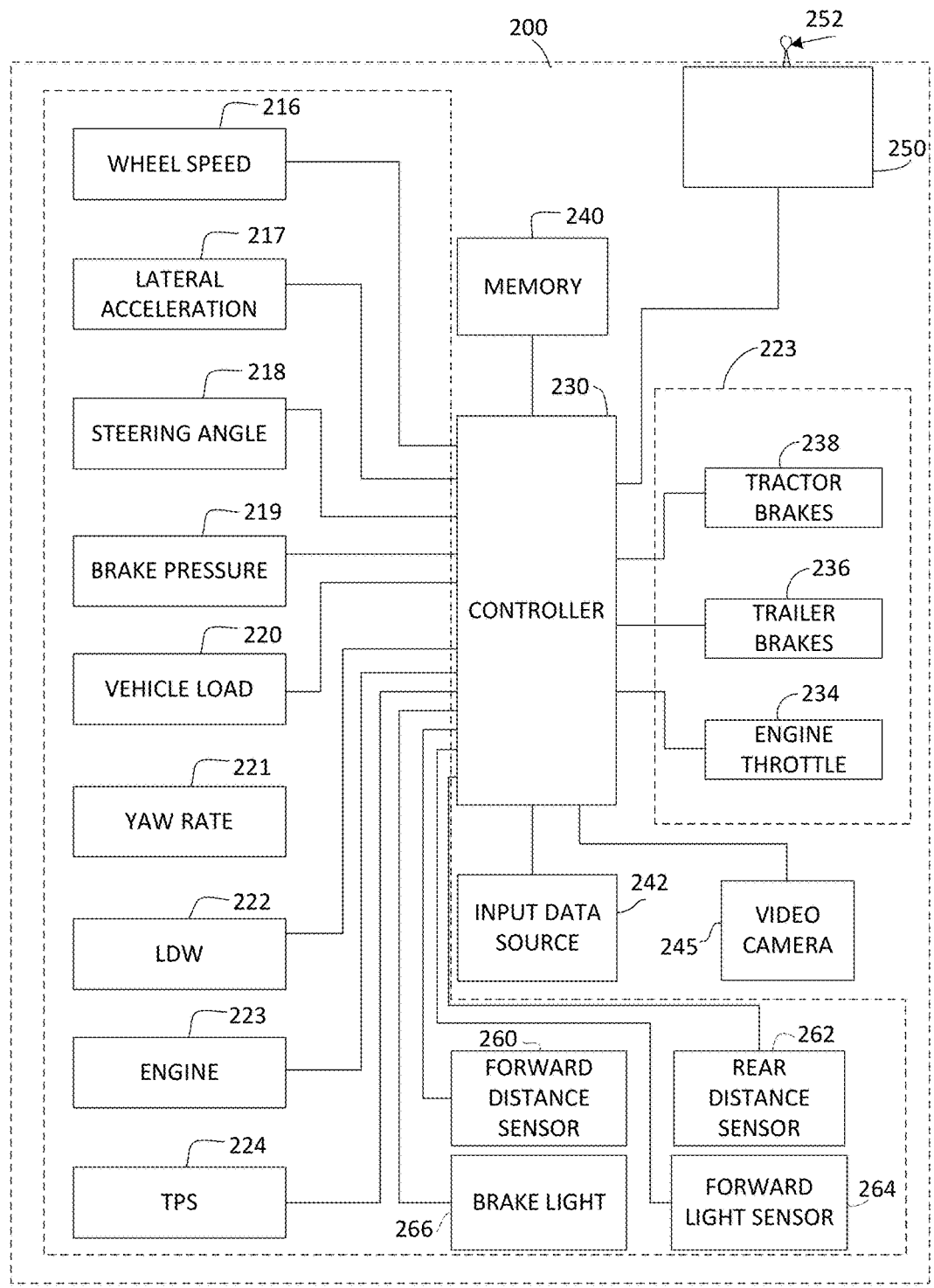
FIG. 2 is a schematic illustration of an exemplary embodiment of a data collection and communication module portion of the subject non-platoon vehicle detection system according to the example embodiment.

With reference next to FIG. 2, a schematic representation of a data collection and communication module portion 200 of the subject sensor-based anti-hacking prevention system according to principles of the example embodiment is illustrated. The data collection and communication module 200 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 2, the data collection and communication module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 619, a vehicle load sensor 220, a yaw rate sensor 221, a lane departure warning (LDW) sensor or system 222, one or more engine condition sensors 223, and a tire pressure (TPMS) monitoring system 224. The data collection and communication module 200 may also utilize additional devices or sensors not described in the exemplary embodiment, or combine one or more devices or sensors into a single unit.

The data collection and communication module 200 may also include a logic applying arrangement 230, such as a controller or processor, in communication with the one or more devices or systems 214. The controller 230 may include one or more inputs for receiving input data from the devices or systems 214. The controller 230 may be adapted to process the input data and compare the raw or processed input data to a stored threshold value. The controller 230 may also include one or more outputs for delivering a control signal to one or more vehicle systems 232 based on the comparison. The control signal may instruct the systems 232 to intervene in the operation of the vehicle to initiate corrective action, and then report this corrective action to a wireless service (not shown) or simply store the data locally to be used for determining a driver quality. For example, the controller 230 may generate and send the control signal to an engine electronic control unit or an actuating device to reduce the engine throttle 234 and slowing the vehicle down. Further, the controller 230 may send the control signal to a vehicle brake system to selectively engage the brakes. In a tractor-trailer arrangement, the controller 230 may engage the brakes on one or more wheels of a trailer portion of the vehicle 236 and the brakes on one or more wheels of a tractor portion of the vehicle 238, and then report this corrective action to the wireless service or simply store the data locally to be used for determining a driver quality. A variety of corrective actions may be possible and multiple corrective actions may be initiated at the same time.

The controller 230 may also include a memory portion 240 for storing and accessing system information, such as for example the system control logic and control tuning. The memory portion 240, however, may be separate from the controller 230. The sensors 214 and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for the controller 230 of the present invention. Therefore, many of the components to support the data collection and communication module 200 of the present invention may be present in a vehicle equipped with the Bendix® ESP® system, thus, not requiring the installation of additional components. The data collection and communication module 200, however, may utilize independently installed components if desired.

The data collection and communication module 200 may also include a source of input data 242 indicative of a configuration/condition of a commercial vehicle. The controller 230 may sense or estimate the configuration/condition of the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 200 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 is operatively coupled with one or more video image capture devices shown in the example embodiment as a single video camera 645 representation of one or more physical video cameras disposed on the vehicle such as, for example, one video camera on each corner of the vehicle.

Still yet further, the data collection and communication module 210 may also include a transmitter module 250 such as, for example, a radio frequency (RF) transmitter including one or more antennas 252 for wireless communication of the one or more various vehicle configuration and/or condition data to one or more destinations such as, for example, to one or more wireless services 50, 60 (FIG. 1) having a corresponding receiver and antenna. The controller 230 is operative to communicate the acquired data to the one or more receivers in a raw data form, that is without processing the data, in a processed form such as in a compressed form, in an encrypted form or both as may be necessary or desired. In this regard, the controller 230 may combine selected ones of the vehicle parameter data values into processed data representative of higher level vehicle condition data such as, for example, data from the lateral acceleration sensor 218 may be combined with the data from the steering angle sensor 220 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

Figure 3:
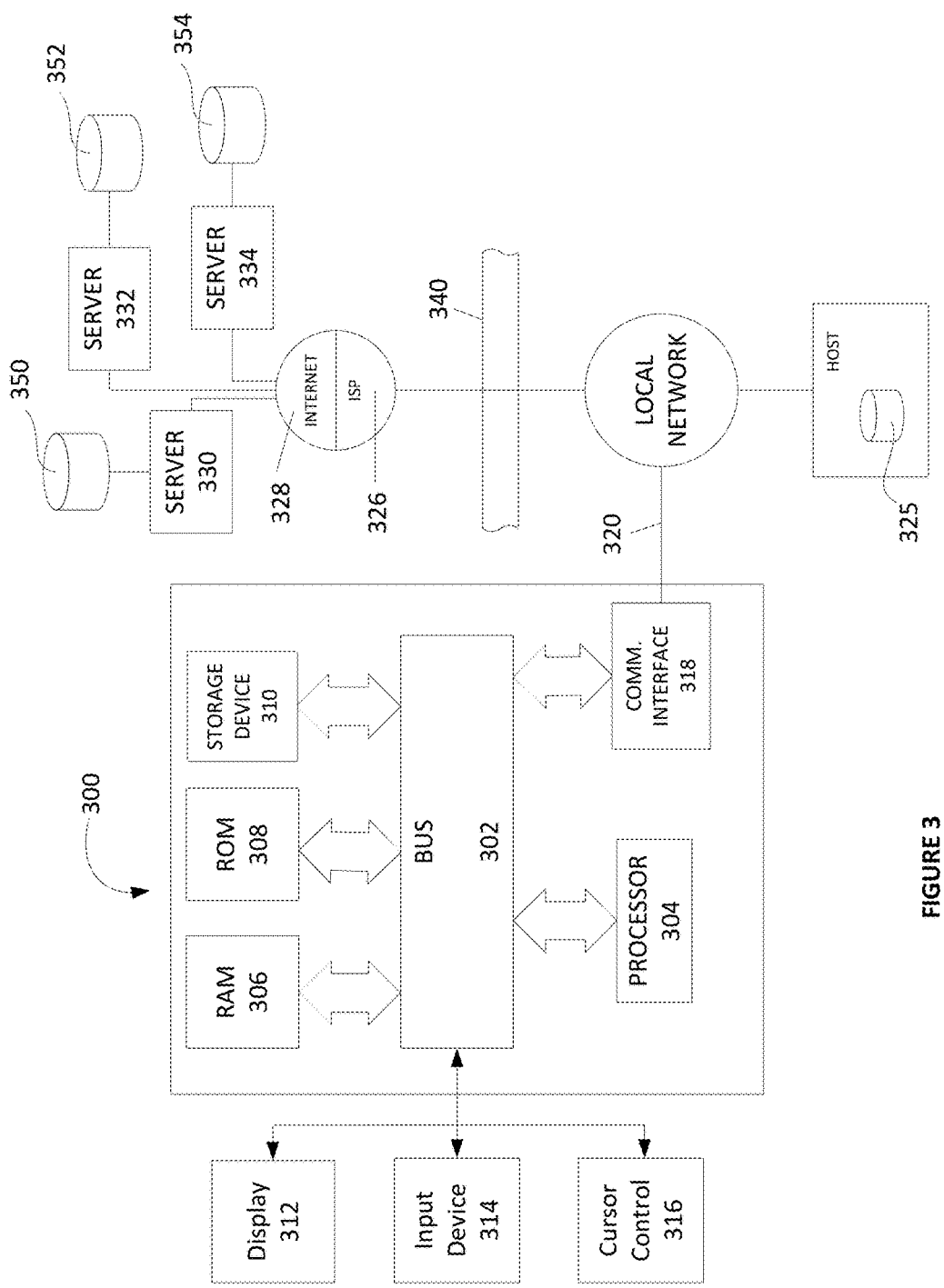
FIG. 3 is a block diagram that illustrates a platoon management computer system suitable for executing embodiments of one or more software systems or modules that perform fleet management and methods of monitoring and reporting according to the example embodiment.

FIG. 3 is a block diagram that illustrates a sensor-based anti-hacking prevention computer system 300 suitable for executing embodiments of one or more software systems or modules that perform fleet management and control according to the subject application. The example system includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the platoon sensor-based anti-hacking prevention computer system 300 for accessing, aggregating, manipulating and displaying information from multiple remote resources such as, for example, indirectly from multiple fleet vehicles 10, 20 and directly from multiple wireless services 50, 60. Further, the embodiments described herein are related to the use of the platoon sensor-based anti-hacking prevention computer system 300 for accessing information from the multiple sources in selective combination with internal proprietary data such as driver sensitive data, sales, costs, expense records, travel data, and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The platoon sensor-based anti-hacking prevention computer system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from the platoon sensor-based anti-hacking prevention computer system 300, are exemplary forms of carrier waves transporting the information.

The platoon sensor-based anti-hacking prevention computer system 300 can send messages and receive data, including program code, through the network(s), network link 320 and communication interface 318. In the Internet-connected example embodiment, the platoon sensor-based anti-hacking prevention computer system 300 is operatively connected with a plurality of external public, private, governmental or commercial servers (not shown) as one or more wireless services 50, 60 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The platoon sensor-based anti-hacking prevention computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although platoon sensor-based anti-hacking prevention computer system 300 is shown in FIG. 3 as being connectable to a set of three (3) servers, 330, 332, and 334, those skilled in the art will recognize that platoon sensor-based anti-hacking prevention computer system 300 may establish connections to multiple additional servers on Internet 328. Each such server in the example embodiments includes HTTP-based Internet applications, which may provide information to platoon sensor-based anti-hacking prevention computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The platoon sensor-based anti-hacking prevention computer system 300 suitably includes several subsystems or modules to perform the anti-hacking detection and prevention management as set forth herein. A primary purpose of the subject application is to provide an improved intuitive and convenient user interface which allows a user to select parameters for performing anti-hacking detection and prevention, and to make adjustments of the parameters based on the result presentation as necessary or desired.

No Intervening Vehicle Ahead Detected

Figure 4:
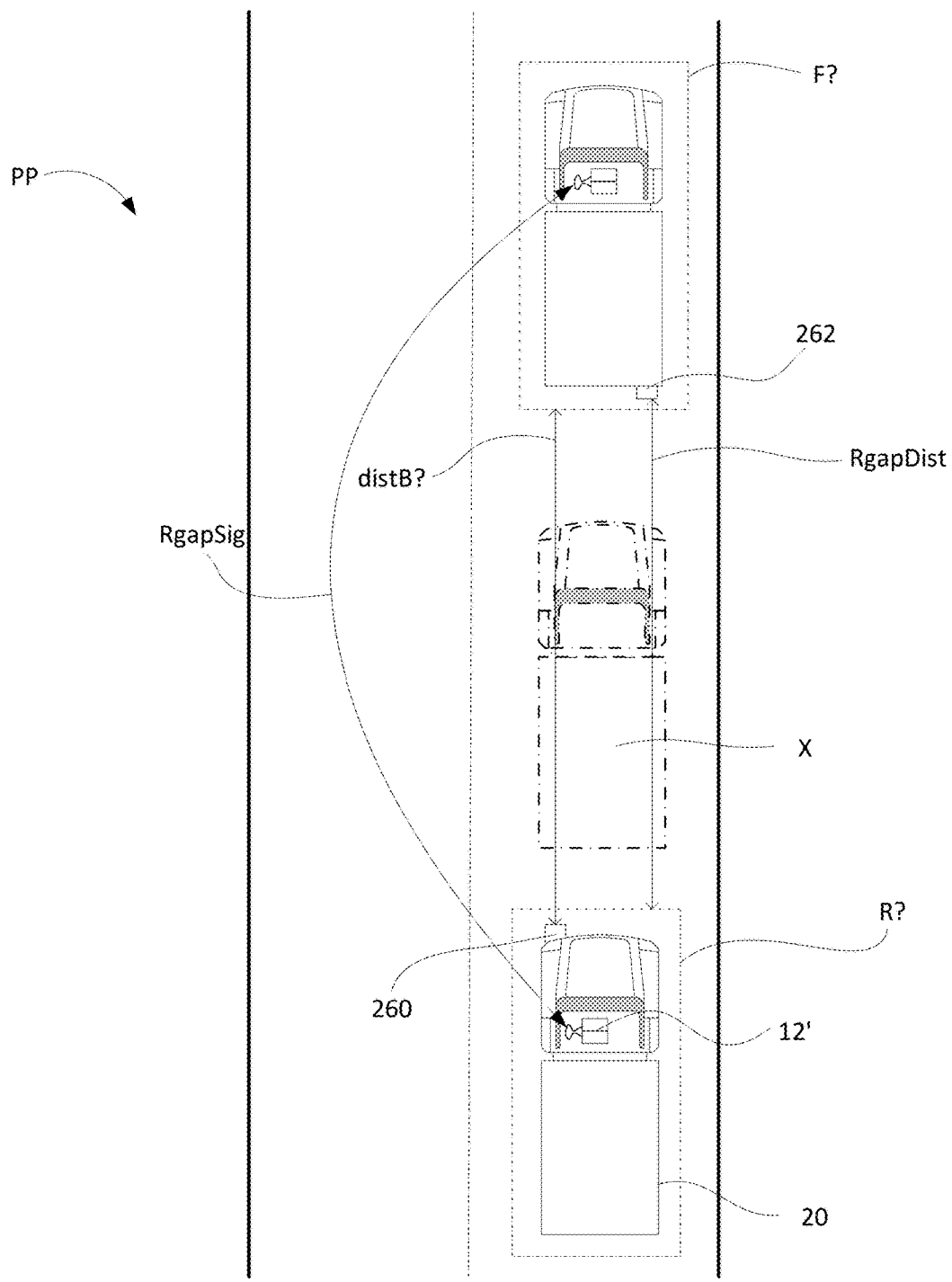
FIG. 4 is a schematic illustration of a determination that a vehicle physically ahead is a platooning next ahead vehicle and not a non-platooning vehicle.

FIG. 4 schematically illustrates a determination by the following vehicle 20 of a platooning vehicle pair PP including the leading vehicle 10 and the following vehicle 20 that a non-platoon vehicle X is not located between the leading and following 10, 20 vehicles, but rather, that the vehicle travelling ahead of the following vehicle 20 is indeed the leading vehicle 10. The vehicles are illustrated in simple block form for ease of illustration and discussion. In addition, each of the vehicles 10, 20, are illustrated surrounded by a dashed block vehicle outline for purposes of illustrating that the forward and rearward distance sensors 260, 262 on each of the respective vehicles only have the ability to measure their distance between the vehicles, but the sensors 260, 262 of course do not have the ability to understand or otherwise determine that the physical vehicle being measured to is in fact either of the leading or following vehicles 10, 20. That is, the forward distance measured by the forward distance sensor 260 of the following vehicle 20 could be either the forward distance to the leading vehicle 10 in which case the embodiment would determine that there is no intervening vehicle X in accordance with the descriptions below, or the measured distance could be inconsistent with the known forward distance to the leading vehicle 10, in which case the embodiment would determine that there is intervening vehicle X in accordance with the descriptions below.

With continued reference to FIG. 4 and as described above, each of the vehicles 10, 20 of the platooning vehicle pair PP includes a system 12, 12' for detecting at least one non-platoon vehicle (X) intermediate the platooning vehicle pair (PP) including the leading vehicle 10 and the following vehicle 20 cooperatively travelling as a platoon (P). The system of the example embodiment comprises a platoon control unit 300 configured to be disposed in the vehicles 10, 20 of the platooning vehicle pair PP. As described above, the platoon control unit 300 comprises a processor, a non-transient memory device operatively coupled with the processor, and logic stored in the non-transient memory and executable by the processor to determine the at least one non-platoon vehicle intermediate the platooning vehicle pair. In addition, the platoon control unit 300 comprises forward and rearward distance sensors operatively coupled with the platoon control unit, a receiver operatively coupled with the platoon control unit, and a transmitter operatively coupled with the platoon control unit.

The forward distance sensor 260 disposed on the following vehicle 20 is operative to sense a forward relative distance (distB?) between the following vehicle 20 of the platooning vehicle pair (PP) and an associated sensed forward vehicle (F?) located ahead of the following vehicle 20. The forward distance sensor 260 disposed on the following vehicle 20 is further operative to generate forward relative distance data (distB?data) representative of the sensed forward relative distance (distB?) between the following vehicle 20 and the associated sensed forward vehicle (F?) located ahead of the associated following vehicle 20.

The receiver operatively coupled with the platoon control unit is operative to receive a rearward relative gap distance signal (RgapSig) from the leading vehicle 10 of the platooning vehicle pair (PP). The receiver is further operative to convert the rearward relative gap distance signal (RgapSig) into rearward relative gap data (RgapSigData) representative of a rearward relative gap distance (RgapDist) as determined by the rear distance sensor 262 of the leading vehicle 10 between the leading vehicle 10 and a sensed rearward vehicle (R?) located behind the leading vehicle 10.

In accordance with the example embodiment, the logic of the platoon control unit is executable by the processor to determine a relative difference between the forward relative distance data (distB?data) and the rearward relative gap data (RgapSigData). Then, the logic is executable by the processor to selectively determine the associated sensed forward vehicle (F?) located ahead of the following vehicle 20 and the associated sensed rearward vehicle (R?) located behind the leading vehicle 10 as not being the at least one non-platoon vehicle (X) intermediate the platooning vehicle pair (PP) in accordance with the determined difference between the forward relative distance data (distB?data) and the rearward relative gap data (RgapSigData). That is, if the forward relative distance data (distB?data) and the rearward relative gap data (RgapSigData) is the same or if the determined difference between the forward relative distance data (distB?data) and the rearward relative gap data (RgapSigData) is small relative to a predetermined threshold value stored in the non-transient memory device, then the logic of the following vehicle 20 determines that there is no intermediate non-platooning vehicle X between the following vehicle and the leading vehicle 10.

In accordance with the example embodiment, the logic of the platoon control unit is executable by the processor to determine the associated sensed forward vehicle (F?) located ahead of the following vehicle 20 and the associated sensed rearward vehicle (R?) located behind the leading vehicle 10 as not being the at least one non-platoon vehicle (X) in accordance with a comparison of a magnitude of the difference between the forward relative distance data (distB?data) and the rearward relative gap data (RgapSigData) relative to a predetermined calibration threshold value stored as calibration threshold data in the non-transient memory device of the platoon control unit. That is, if the magnitude of the difference between the forward relative distance data (distB?data) and the rearward relative gap data (RgapSigData) is very small relative to the predetermined calibration threshold value stored as the calibration threshold data in the non-transient memory device, the platoon control unit determines the associated sensed forward vehicle (F?) located ahead of the following vehicle 20 and the associated sensed rearward vehicle (R?) located behind the leading vehicle 10 is not the at least one non-platoon vehicle (X).

Further in accordance with the example embodiment, the logic of the platoon control unit is executable by the processor to determine the associated sensed forward vehicle (F?) located ahead of the following vehicle 20 and the associated sensed rearward vehicle (R?) located behind the leading vehicle 10 as being the leading vehicle 10 and the following vehicle 20, respectively, in accordance with a numeric correspondence between the forward relative distance data (distB?data) and the rearward relative gap data (RgapSigData). That is, if there is numeric correspondence between the forward relative distance data (distB?data) and the rearward relative gap data (RgapSigData), the platoon control unit determines the associated sensed forward vehicle (F?) located ahead of the following vehicle 20 and the associated sensed rearward vehicle (R?) located behind the leading vehicle 10 are the leading and following vehicles (10, 20), respectively.

Still further in accordance with the example embodiment, the platoon control unit is operable to selectively generate a platoon continue signal (Cont) in accordance with determining the associated sensed forward vehicle (F?) located ahead of the following vehicle 20 and the associated sensed rearward vehicle (R?) located behind the leading vehicle 10 as being the leading vehicle 10 and the following vehicle 20, respectively. In the embodiment, the platoon continue signal (Cont) is used by the following vehicle 20 to manage the platoon (P) by selectively continuing participation by the following vehicle 20 in the platoon responsive to a platoon management system (Mgmt) of the following vehicle 20 receiving the platoon continue signal (Cont).

Intervening Vehicle Ahead Detected

Figure 5:
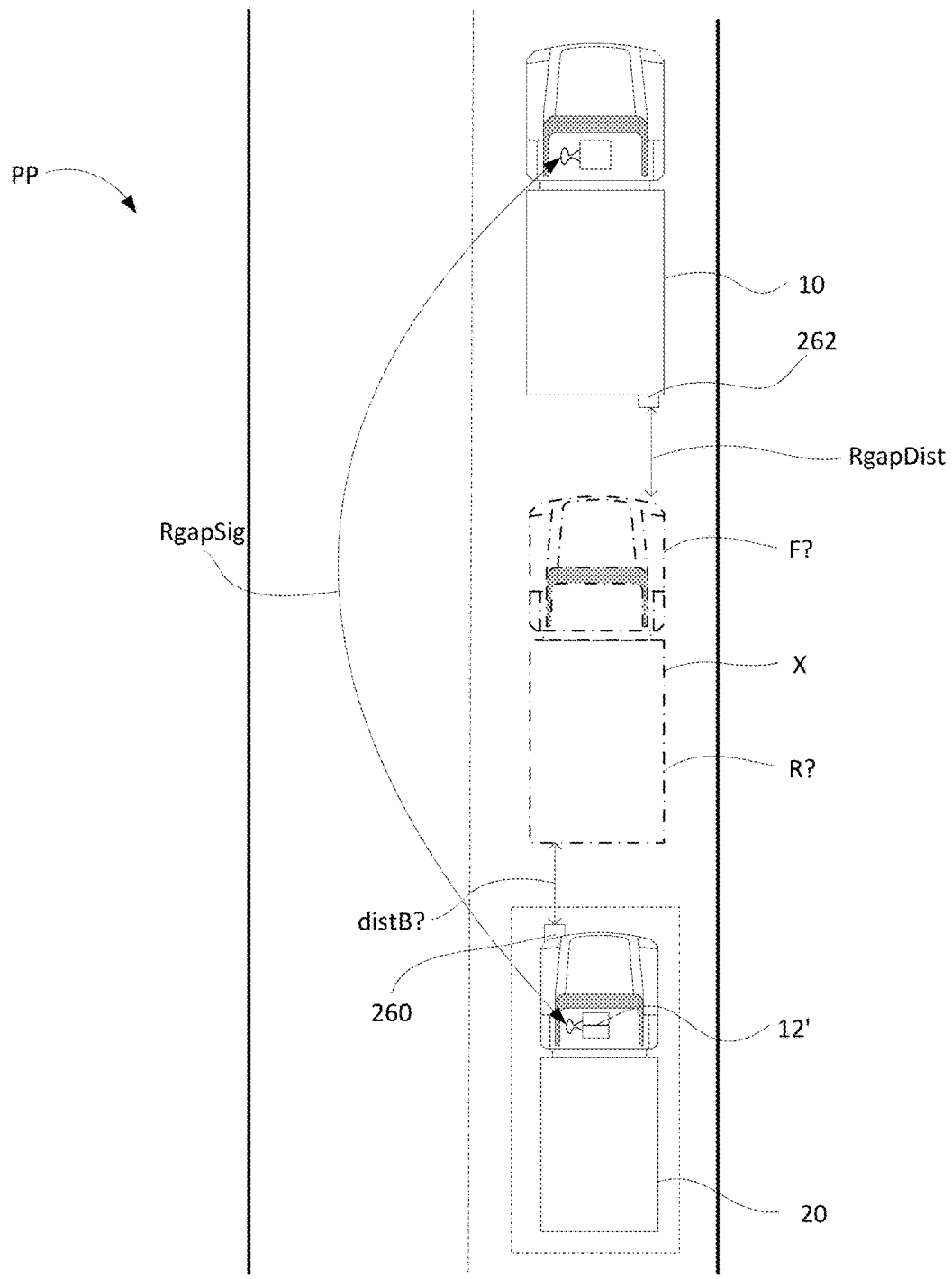
FIG. 5 is a schematic illustration of a determination that a vehicle physically ahead is a non-platooning vehicle and not a platooning next ahead vehicle.

FIG. 5 schematically illustrates a determination by the following vehicle 20 of the platooning vehicle pair PP of FIG. 4 including the leading vehicle 10 and the following vehicle 20 that a non-platoon vehicle X is located between the leading and following 10, 20 vehicles, and therefore that the vehicle travelling ahead of the following vehicle 20 is not the leading vehicle 10 but, rather, is the non-platoon vehicle X. The vehicles are again illustrated in simple block form for ease of illustration and discussion. In addition, the vehicle illustrated as a dashed block vehicle outline is for purposes of illustrating that the forward and rearward distance sensors 260, 262 on each of the respective vehicles only have the ability to measure the distance between the vehicles, but the sensors 260, 262 of course do not have the ability to understand or otherwise determine that the physical vehicle being measured to is in fact either of the leading or following vehicles 10, 20. That is, the forward distance measured by the forward distance sensor 260 of the following vehicle 20 could be either the forward distance to the leading vehicle 10 in which case the embodiment would determine that there is no intervening vehicle X in accordance with the descriptions above, or the measured distance could be inconsistent with the known forward distance to the leading vehicle 10 in which case the embodiment would determine that there is intervening vehicle X in accordance with the descriptions below.

As described above, each of the vehicles 10, 20 of the platooning vehicle pair PP includes a system 12, 12' for detecting at least one non-platoon vehicle (X) intermediate the platooning vehicle pair (PP) including the leading vehicle 10 and the following vehicle 20 cooperatively travelling as a platoon (P). The forward distance sensor 260 disposed on the following vehicle 20 is operative to sense a forward relative distance (distB?) between the following vehicle 20 of the platooning vehicle pair (PP) and an associated sensed forward vehicle (F?) located ahead of the associated following vehicle 20. The forward distance sensor 260 disposed on the following vehicle 20 is further operative to generate forward relative distance data (distB?data) representative of the sensed forward relative distance (distB?) between the associated following vehicle 20 and the associated sensed forward vehicle (F?) located ahead of the associated following vehicle 20.

The receiver operatively coupled with the platoon control unit is operative to receive a rearward relative gap distance signal (RgapSig) from the leading vehicle 10 of the platooning vehicle pair (PP). The receiver is further operative to convert the rearward relative gap distance signal (RgapSig) into rearward relative gap data (RgapSigData) representative of a rearward relative gap distance (RgapDist) as determined by the rearward distance sensor 262 of the leading vehicle 10 between the leading vehicle 10 and a sensed rearward vehicle (R?) located behind the leading vehicle 10.

In accordance with the example embodiment illustrated, the logic of the platoon control unit is executable by the processor to selectively determine the associated sensed forward vehicle (F?) located ahead of the associated following vehicle 20 and the associated sensed rearward vehicle (R?) located behind the associated leading vehicle 10 as being the at least one non-platoon vehicle (X) intermediate the platooning vehicle pair (PP) in accordance with the determined difference between the forward relative distance data (distB?data) and the rearward relative gap data (RgapSigData). That is, if the forward relative distance data (distB?data) and the rearward relative gap data (RgapSigData) is different or if the determined difference between the forward relative distance data (distB?data) and the rearward relative gap data (RgapSigData) is large relative to the predetermined calibration threshold value stored as calibration threshold data in the non-transient memory device of the platoon control unit, then the logic of the following vehicle 20 determines that there is an intermediate non-platooning vehicle X between the following vehicle and the leading vehicle 10.

In accordance with the example embodiment, the logic of the platoon control unit is executable by the processor to determine the associated sensed forward vehicle (F?) located ahead of the following vehicle 20 and the associated sensed rearward vehicle (R?) located behind the leading vehicle 10 as being the at least one non-platoon vehicle (X) in accordance with a comparison of a magnitude of the difference between the forward relative distance data (distB?data) and the rearward relative gap data (RgapSigData) relative to a predetermined calibration threshold value stored as calibration threshold data in the non-transient memory device of the platoon control unit. That is, if the magnitude of the difference between the forward relative distance data (distB?data) and the rearward relative gap data (RgapSigData) is large relative to the predetermined calibration threshold value stored as the calibration threshold data in the non-transient memory device, the platoon control unit determines the associated sensed forward vehicle (F?) located ahead of the following vehicle 20 and the associated sensed rearward vehicle (R?) located behind the leading vehicle 10 is the at least one non-platoon vehicle (X).

Further in accordance with the example embodiment, the logic of the platoon control unit is executable by the processor to determine the associated sensed forward vehicle (F?) located ahead of the following vehicle 20 and the associated sensed rearward vehicle (R?) located behind the leading vehicle 10 as being the at least one non-platoon vehicle (X) in accordance with a numeric mis-correspondence between the forward relative distance data (distB?data) and the rearward relative gap data (RgapSigData). That is, if there is no numeric correspondence between the forward relative distance data (distB?data) and the rearward relative gap data (RgapSigData), the platoon control unit determines the associated sensed forward vehicle (F?) located ahead of the following vehicle 20 and the associated sensed rearward vehicle (R?) located behind the leading vehicle 10 is the at least one non-platoon vehicle (X).

Still further in accordance with the example embodiment, the platoon control unit is operable to selectively generate a platoon discontinue signal (Break) in accordance with determining the associated sensed forward vehicle (F?) located ahead of the following vehicle 20 and the associated sensed rearward vehicle (R?) located behind the leading vehicle 10 as being the at least one non-platoon vehicle (X) intermediate the platooning vehicle pair (PP). The platoon discontinue signal (Break) is used by the associated following vehicle 20 to manage the platoon (P) by discontinuing participation by the following vehicle 20 in the platoon responsive to a platoon management system (Mgmt) of the following vehicle 20 receiving the platoon discontinue signal (Break).

Intervening Vehicle Detection Assistance

It is useful for the following vehicle 20 to provide intervening vehicle detection assistance to any of the platooning vehicles of the platoon P. In this connection, reference is now made to FIG. 6 which schematically illustrates assistance provided by the following vehicle 20 of the platoon to a third vehicle 30 of the platoon and following the vehicle 20. The vehicles are illustrated in simple block form for ease of illustration and discussion. In addition, each of the vehicles 20, 30, are illustrated surrounded by a dashed block vehicle outline for purposes of illustrating that the forward and rearward distance sensors 260, 262 on each of the respective vehicles only have the ability to measure their distance between the vehicles, but the sensors 260, 262 of course do not have the ability to understand or otherwise determine that the physical vehicle being measured to is in fact either of the leading or following vehicles 20, 30. That is, the rearward distance measured by the following vehicle 20 could be either the rearward distance to the third vehicle 30 in which case the embodiment would determine that there is no intervening vehicle X in accordance with the descriptions below, or the measured distance could be inconsistent with the known rearward to the third vehicle 30 in which case the embodiment would determine that there is intervening vehicle X in accordance with the descriptions below.

As described above, the platoon sensor-based anti-hacking prevention computer system control unit 300 comprises a processor, a non-transient memory device operatively coupled with the processor, and logic stored in the non-transient memory and executable by the processor to determine the at least one non-platoon vehicle intermediate the platooning vehicle pair. In addition, the platoon control unit 300 comprises forward 260 and rearward 262 distance sensors operatively coupled with the platoon control unit, a receiver 250 operatively coupled with the platoon control unit, and a transmitter 250 operatively coupled with the platoon control unit. The rearward distance sensor 262 disposed on the following vehicle 20 is operative to sense a rearward relative distance (distC?) between the associated following vehicle 20 of the platooning vehicle pair (PP) and an associated sensed trailing vehicle (CC?) located behind the associated following vehicle 20. The rearward distance sensor 262 is further operative to generate rearward relative distance data (distC?data) representative of the sensed rearward relative distance (distC?) between the following vehicle 20 of the platooning vehicle pair (PP) and an associated sensed trailing vehicle (CC?) located behind the associated following vehicle 20.

The transmitter 250 of the following vehicle 20 operatively coupled with the platoon control unit of the vehicle 20 is operable to convert the rearward relative distance data (distC?data) into a rearward relative distance signal (distC?sig), and to transmit the rearward relative distance signal (distC?sig) from the associated following vehicle 20 of the platooning vehicle pair.

Correspondingly, the receiver 250 of the following vehicle 20 is operable to receive a forward relative gap distance signal (FgapSig) from the associated third vehicle 30 of the platoon (P) located rearward of the following vehicle 20, and to convert the forward relative gap distance signal (FgapSig) into forward relative gap distance data (FgapsigData) representative of a forward relative gap distance (FgapDist) as determined by the associated third vehicle 30 between the following vehicle 20 and the associated third vehicle 30 located rearward of the following vehicle 20.

In addition, the logic of the platoon control unit of the following vehicle is executable by the processor to determine a relative difference between the rearward relative distance data (distC?data) representative of the sensed rearward relative distance (distC?) between the following vehicle 20 of the platooning vehicle pair (PP) and the associated sensed trailing vehicle (CC?) located behind the following vehicle 20 and the forward relative gap distance data (FgapsigData) representative of the forward relative gap distance (FgapDist) as determined by the associated third vehicle 30 between the following vehicle 20 and the associated third vehicle 30. The logic is operative to then selectively determine the associated sensed trailing vehicle (CC?) located behind the following vehicle 20 as being the at least one non-platoon vehicle (X) in accordance with determining a difference between the rearward relative distance data (distC?data) and the forward relative gap distance data (FgapsigData).

Intervening Vehicle Behind not Detected

Figure 6:
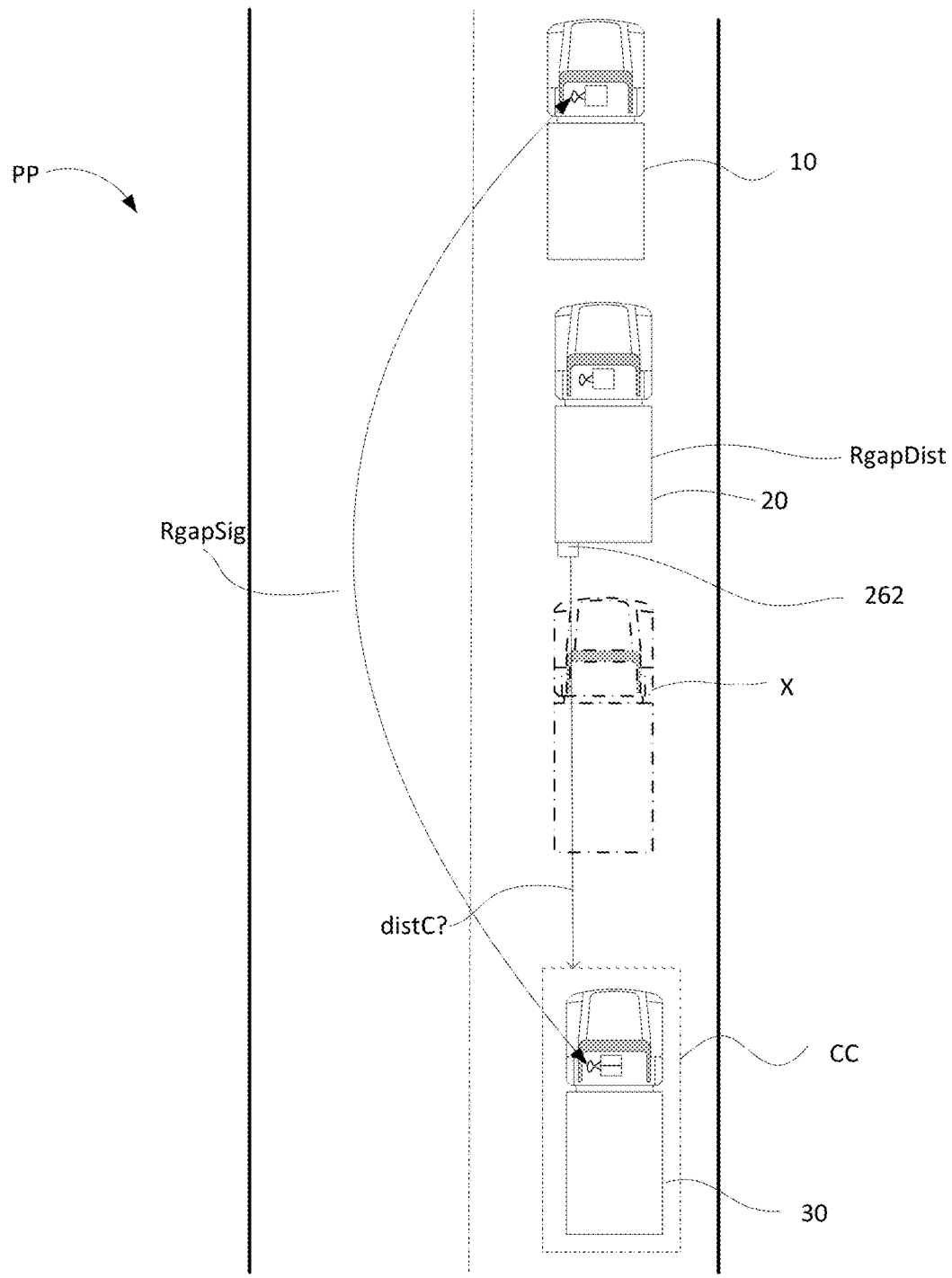
FIG. 6 is a schematic illustration of a determination that a vehicle physically behind is a platooning next behind vehicle and not a non-platooning vehicle.

With continued reference to FIG. 6, the receiver 250 of the following vehicle 20 is operable to receive a forward relative gap distance signal (FgapSig) from the associated third vehicle 30 of the platoon (P) located rearward of the following vehicle 20, and to convert the forward relative gap distance signal (FgapSig) into forward relative gap distance data (FgapsigData) representative of a forward relative gap distance (FgapDist) as determined by the associated third vehicle 30 between the following vehicle 20 and the associated third vehicle 30 located rearward of the following vehicle 20.

In addition, the logic of the platoon control unit of the following vehicle 20 is executable by the processor to determine a relative difference between the rearward relative distance data (distC?data) representative of the sensed rearward relative distance (distC?) between the following vehicle 20 of the platooning vehicle pair (PP) and the associated sensed trailing vehicle (CC?) located behind the following vehicle 20 and the forward relative gap distance data (FgapsigData) representative of the forward relative gap distance (FgapDist) as determined by the associated third vehicle 30 between the following vehicle 20 and the associated third vehicle 30. The logic is operative to then selectively determine the associated sensed trailing vehicle (CC?) located behind the following vehicle 20 as being the third vehicle 30 in accordance with determining little or no difference between the rearward relative distance data (distC?data) and the forward relative gap distance data (FgapsigData).

In the example embodiment, the logic of the platoon control unit is executable by the processor to determine the associated sensed trailing vehicle (CC?) located behind the associated following vehicle 20 as being the third vehicle 30 in accordance with a comparison of a magnitude of the difference between the rearward relative distance data (distC?data) and the forward relative gap distance data (FgapsigData). That is, if the magnitude of the difference between the rearward relative distance data (distC?data) and the forward relative gap distance data (FgapsigData) is very small relative to the predetermined calibration threshold value stored as the calibration threshold data in the non-transient memory device, the platoon control unit determines the associated sensed trailing vehicle (CC?) located behind the associated following vehicle 20 as being the third vehicle 30 and not the at least one non-platoon vehicle (X).

Further in the example embodiment, the logic of the platoon control unit is executable by the processor to determine the associated sensed trailing vehicle (CC?) located behind the associated following vehicle 20 as being the associated third vehicle 30 located rearward of the associated following vehicle 20 in accordance with a correspondence between the rearward relative distance data (distC?data) and the forward relative gap distance data (FgapsigData).

Yet still further, the platoon control unit is operable to selectively generate a platoon continue signal (Cont) in accordance with determining the associated sensed trailing vehicle (CC?) located behind the associated following vehicle 20 as being the associated third vehicle 30 located rearward of the associated following vehicle 20. In the example embodiment, the platoon continue signal (Cont) being used by the associated following vehicle 20 to manage the platoon (P) by selectively continuing participation by the associated following vehicle 20 in the platoon responsive to a platoon management system (Mgmt) of the associated following vehicle 20 receiving the platoon continue signal (Cont).

Intervening Vehicle Behind Detected

Figure 7:
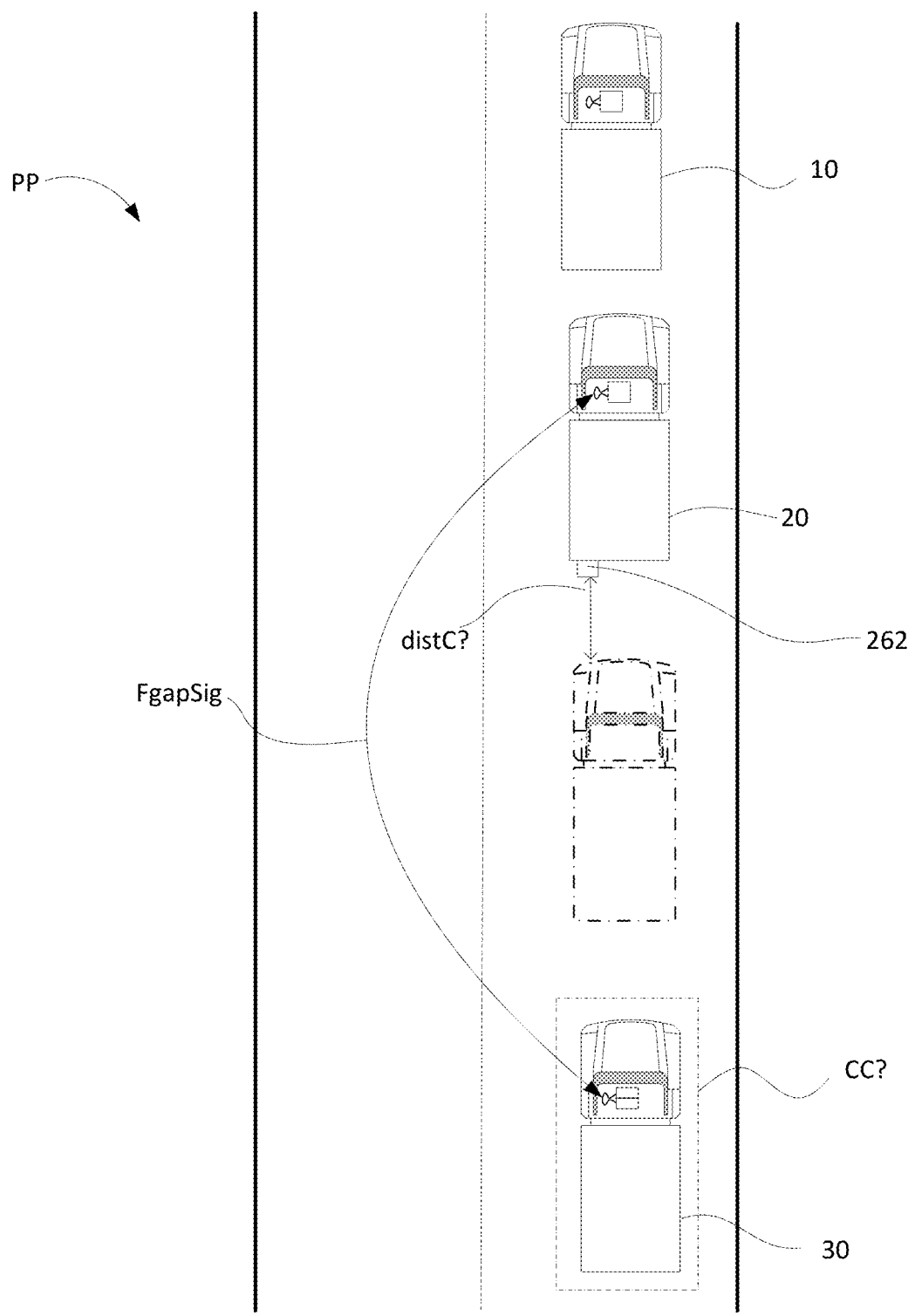
FIG. 7 is a schematic illustration of a determination that a vehicle physically behind is a non-platooning vehicle and not a platooning next behind vehicle.

With reference next to FIG. 7, the receiver of the following vehicle 20 is operable to receive the forward relative gap distance signal (FgapSig) from the associated third vehicle 30 of the platoon (P) located rearward of the following vehicle 20, and to convert the forward relative gap distance signal (FgapSig) into forward relative gap distance data (FgapsigData) representative of a forward relative gap distance (FgapDist) as determined by the associated third vehicle 30 between the following vehicle 20 and the associated third vehicle 30 located rearward of the following vehicle 20.

In addition, the logic of the platoon control unit of the following vehicle is executable by the processor to determine a relative difference between the rearward relative distance data (distC?data) representative of the sensed rearward relative distance (distC?) between the following vehicle 20 of the platooning vehicle pair (PP) and the associated sensed trailing vehicle (CC?) located behind the following vehicle 20 and the forward relative gap distance data (FgapsigData) representative of the forward relative gap distance (FgapDist) as determined by the associated third vehicle 30 between the following vehicle 20 and the associated third vehicle 30. The logic is operative to then selectively determine the associated sensed trailing vehicle (CC?) located behind the following vehicle 20 as being the non-platoon vehicle (X) in accordance with determining a difference between the rearward relative distance data (distC?data) and the forward relative gap distance data (FgapsigData).

In the example embodiment, the logic of the platoon control unit is executable by the processor to determine the associated sensed trailing vehicle (CC?) located behind the associated following vehicle 20 as being the non-platoon vehicle (X) in accordance with a comparison of a magnitude of the difference between the rearward relative distance data (distC?data) and the forward relative gap distance data (FgapsigData). That is, if the magnitude of the difference between the rearward relative distance data (distC?data) and the forward relative gap distance data (FgapsigData) is large relative to the predetermined calibration threshold value stored as the calibration threshold data in the non-transient memory device, the platoon control unit determines the associated sensed trailing vehicle (CC?) located behind the associated following vehicle 20 as being the non-platoon vehicle (X) and not the third vehicle 30.

Further in the example embodiment, the logic of the platoon control unit is executable by the processor to determine the associated sensed trailing vehicle (CC?) located behind the associated following vehicle 20 as being the non-platoon vehicle (X) located rearward of the associated following vehicle 20 in accordance with a non-correspondence between the rearward relative distance data (distC?data) and the forward relative gap distance data (FgapsigData).

Yet still further, the platoon control unit is operable to selectively generate generate a platoon discontinue signal (Break) in accordance with determining the associated sensed trailing vehicle (CC?) located behind the associated following vehicle 20 as being the at least one non-platoon vehicle (X). In the embodiment, the platoon discontinue signal (Break) is used by the associated following vehicle 20 to manage the platoon (P) by discontinuing participation by the associated following vehicle 20 in the platoon responsive to a platoon management system (Mgmt) of the associated following vehicle 20 receiving the platoon discontinue signal (Break).

Figure 8:
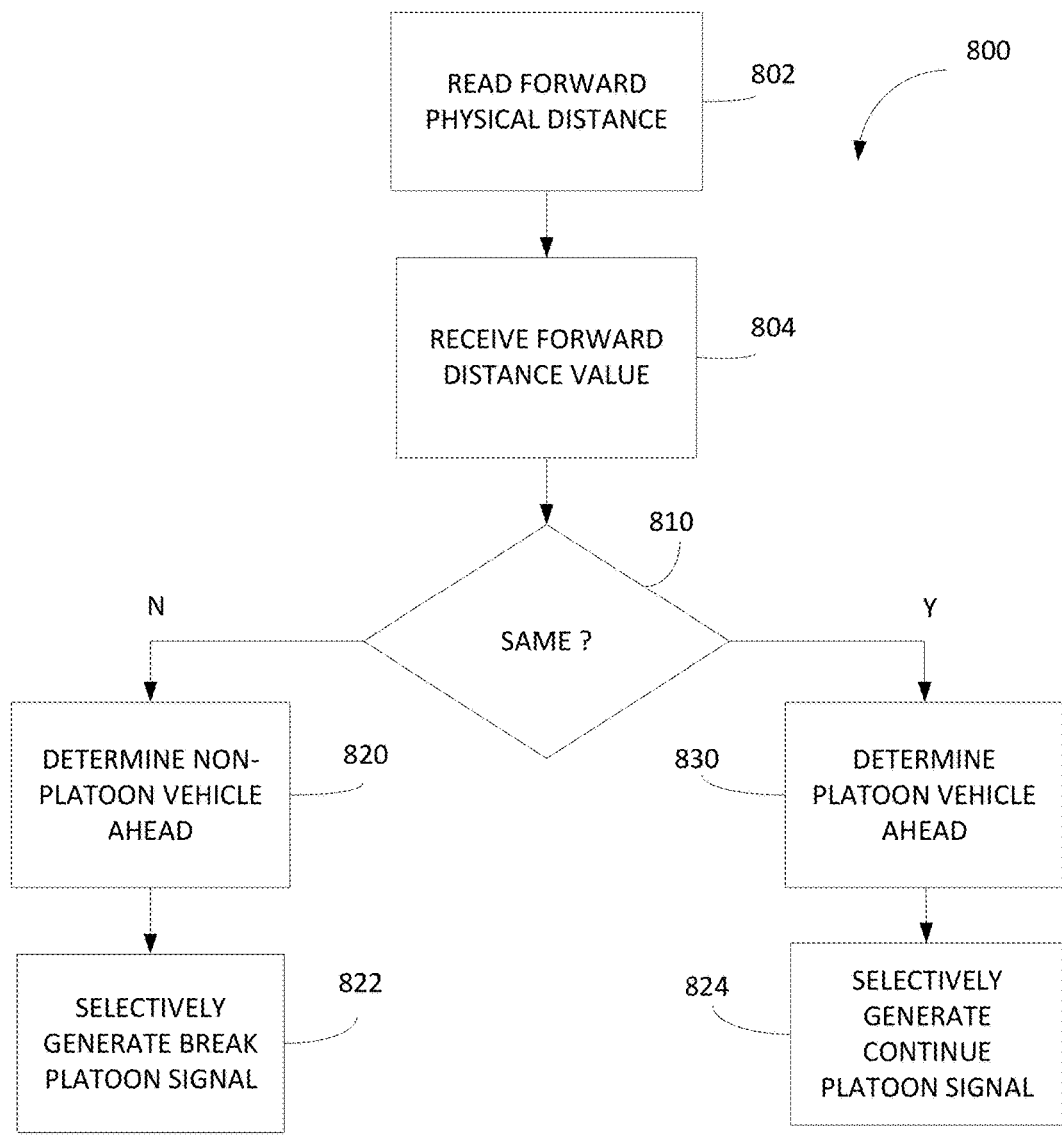
FIG. 8 is a flow diagram showing a method of detection of a non-platoon vehicle ahead of a platooning vehicle.

FIG. 8 is a flow diagram showing a method 800 of detection of a non-platoon vehicle ahead of a platooning vehicle. As noted above, the electronic control system 12 is provided for communication and control functions. Logic such as software or other forms are executed by the processor of the control system 12 in order to conduct communication functionality, vehicle and driver parameter manipulation, and platoon management including, in the example embodiment, detection of a non-platoon vehicle ahead of, intermediate or adjacent to platooning vehicles. Although the portions of the method 800 are illustrated as functioning serially, it is to be appreciated that the particular serial arrangement is for ease of illustration purposes only, and that the embodiments herein are not limited the exact serial execution, and may be executed in any particular order or in any combination order or in parallel by the control system or an equivalent control system as may be necessary or desired.

In one example, executable instructions associated with performing a method may be embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform method 1000. While executable instructions associated with the above method are described as being embodied as a logic encoded in one or more tangible media, it is to be appreciated that executable instructions associated with other example methods described herein may also be stored on a tangible media.

With reference to FIG. 8, the method 800 of an example embodiment for detection of a non-platoon vehicle ahead of a platooning vehicle includes at step 802 the platooning vehicle determines a forward physical distance between itself and a vehicle physically ahead. The platooning vehicle receives at step 804 from a next ahead platooning vehicle a value of a rearward distance to the platooning vehicle. The platooning vehicle compares at step 810 the determined physical distance with the value of the rearward distance to the platooning vehicle received from the next ahead platooning vehicle. The vehicle physically ahead is determined at step 830 to be the next ahead platooning vehicle in accordance with a correspondence between the determined physical distance and the received value of the rearward distance. Conversely, the vehicle physically ahead is determined at step 820 to be a non-platooning vehicle in accordance with a mis-correspondence between the determined physical distance and the received value of the rearward distance. A platoon continue command is selectively generated at step 824 responsive to the vehicle physically ahead being determined to be the next forward platooning vehicle. A platoon break command is selectively generated at step 822 responsive to the vehicle physically ahead being determined to be a non-platooning vehicle.

Figure 9:
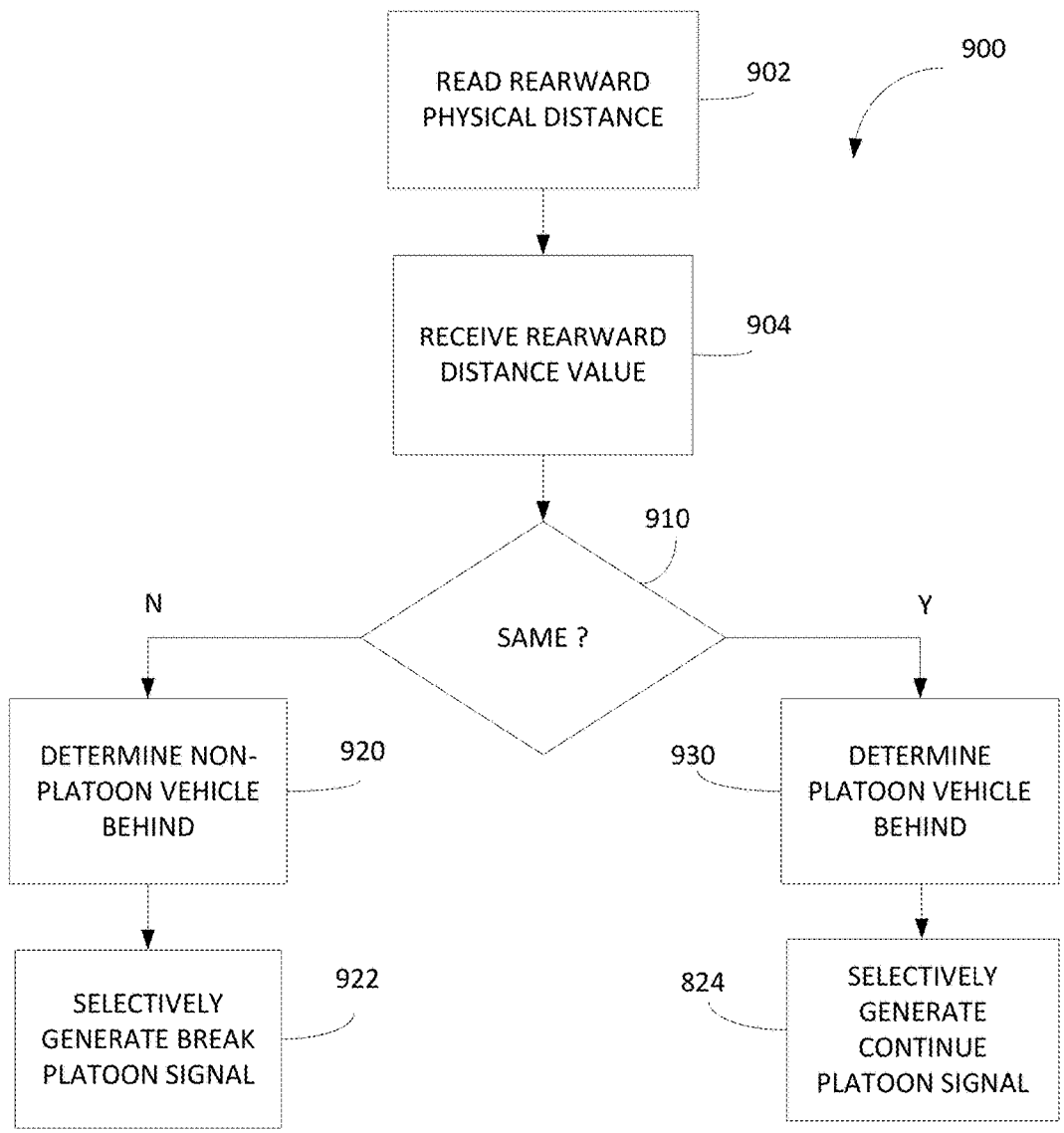
FIG. 9 is a flow diagram showing a method of detection of a non-platoon vehicle behind a platooning vehicle.

FIG. 9 is a flow diagram showing a method 900 of detection of a non-platoon vehicle behind a platooning vehicle. At step 902 the platooning vehicle determines a rearward physical distance between itself and a vehicle physically behind. The platooning vehicle receives at step 904 from a next behind platooning vehicle a value of a forward distance to the platooning vehicle. The platooning vehicle compares at step 910 the determined physical distance with the value of the forward distance to the platooning vehicle received from the next behind platooning vehicle. The vehicle physically behind is determined at step 930 to be the next behind platooning vehicle in accordance with a correspondence between the determined physical distance and the received value of the forward distance. Conversely, the vehicle physically behind is determined at step 920 to be a non-platooning vehicle in accordance with a mis-correspondence between the determined physical distance and the received value of the forward distance. A platoon continue command is selectively generated at step 924 responsive to the vehicle physically behind being determined to be the next behind platooning vehicle. A platoon break command is selectively generated at step 922 responsive to the vehicle physically behind being determined to be a non-platooning vehicle.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A system for detecting at least one non-platoon vehicle intermediate platooning vehicles comprising a platooning vehicle pair including an associated leading vehicle and an associated following vehicle cooperatively travelling as a platoon, the system comprising:
    a platoon control unit configured to be disposed in the associated following vehicle of the platooning vehicle pair, the platoon control unit comprising:
        a processor;
        a non-transient memory device operatively coupled with the processor; and
        logic stored in the non-transient memory and executable by the processor to determine the at least one non-platoon vehicle intermediate the platooning vehicle pair;
    a forward distance sensor on the associated following vehicle and operatively coupled with the platoon control unit, the forward distance sensor:
        sensing a forward distance between the associated following vehicle of the platooning vehicle pair and an associated sensed forward vehicle located ahead of the associated following vehicle; and
        generating forward distance data representative of the sensed forward distance between the associated following vehicle and the associated sensed forward vehicle located ahead of the associated following vehicle; and
    a receiver operatively coupled with the platoon control unit, the receiver:
        receiving a rearward gap distance signal from the associated leading vehicle of the platooning vehicle pair; and
        converting the rearward gap distance signal into rearward gap data representative of a rearward gap distance as determined by the associated leading vehicle between the associated leading vehicle and an associated sensed rearward vehicle located behind the associated leading vehicle,
    wherein the logic of the platoon control unit is executable by the processor to determine a magnitude of a difference between the forward distance data and the rearward gap data,
    wherein the logic of the platoon control unit is executable by the processor to selectively determine the associated sensed forward vehicle located ahead of the associated following vehicle and the associated sensed rearward vehicle located behind the associated leading vehicle as being the at least one non-platoon vehicle intermediate the platooning vehicle pair based on the determined magnitude of the difference between the forward distance data and the rearward gap data.

2. The system according to claim 1, wherein the logic of the platoon control unit is executable by the processor to selectively determine the associated sensed forward vehicle located ahead of the associated following vehicle and the associated sensed rearward vehicle located behind the associated leading vehicle as being the at least one non-platoon vehicle based on a comparison between:
    the magnitude of the difference between the forward distance data and the rearward gap data and
    a predetermined calibration threshold value stored as calibration threshold data in the non-transient memory device of the platoon control unit.

3. The system according to claim 1, wherein the platoon control unit selectively generates a platoon discontinue signal based on determining the associated sensed forward vehicle located ahead of the associated following vehicle and the associated sensed rearward vehicle located behind the associated leading vehicle as being the at least one non-platoon vehicle intermediate the platooning vehicle pair, the platoon discontinue signal being transmitted by the platoon control unit to a platoon management system of the associated following vehicle to manage the platoon by discontinuing participation by the associated following vehicle in the platoon responsive to the platoon management system receiving the platoon discontinue signal.

4. The system according to claim 1, wherein:
    the logic of the platoon control unit is executable by the processor to determine the associated sensed forward vehicle located ahead of the associated following vehicle as being the associated leading vehicle and the associated sensed rearward vehicle located behind the associated leading vehicle as being the associated following vehicle based on a correspondence between the forward distance data and the rearward gap data.

5. The system according to claim 4, wherein:
    the platoon control unit selectively generates a platoon continue signal based on determining the associated sensed forward vehicle located ahead of the associated following vehicle and the associated sensed rearward vehicle located behind the associated leading vehicle as being the associated leading vehicle and the associated following vehicle, respectively, the platoon continue signal being transmitted by the platoon control unit to a platoon management system of the associated following vehicle to manage the platoon by selectively continuing participation by the associated following vehicle in the platoon responsive to the platoon management system of the associated following vehicle receiving the platoon continue signal.

6. The system according to claim 1, further comprising:
    a rearward distance sensor on the associated following vehicle and operatively coupled with the platoon control unit, the rearward distance sensor:

sensing a rearward distance between the associated following vehicle of the platooning vehicle pair and an associated sensed trailing vehicle located behind the associated following vehicle of the platooning vehicle pair; and generating rearward distance data representative of the sensed rearward distance between the associated following vehicle of the platooning vehicle pair and the associated sensed trailing vehicle located behind the associated following vehicle of the platooning vehicle pair; and a transmitter operatively coupled with the platoon control unit, the transmitter:

converting the rearward distance data into a rearward distance signal; and transmitting the rearward distance signal from the associated following vehicle of the platooning vehicle pair.

7. The system according to claim 1, further comprising:
a rearward distance sensor on the associated following vehicle and operatively coupled with the platoon control unit, the rearward distance sensor:

sensing a rearward distance between the associated following vehicle of the platooning vehicle pair and an associated sensed trailing vehicle located behind the associated following vehicle of the platooning vehicle pair; and generating rearward distance data representative of the sensed rearward distance between the associated following vehicle of the platooning vehicle pair and the associated sensed trailing vehicle located behind the associated following vehicle of the platooning vehicle pair.

8. The system according to claim 7, wherein the platooning vehicles cooperatively travelling as the platoon include the associated leading and following vehicles of the platooning vehicle pair, and an associated third vehicle located rearward of the associated following vehicle of the platooning vehicle pair, and wherein:

the receiver:

receives a forward gap distance signal from the associated third vehicle of the platoon; and converts the forward gap distance signal into forward gap distance data representative of a forward gap distance as determined by the associated third vehicle between the associated following vehicle and the associated third vehicle located rearward of the associated following vehicle; and the logic of the platoon control unit is executable by the processor to:

determine a magnitude of a difference between:

the rearward distance data representative of the sensed rearward distance between the associated following vehicle of the platooning vehicles and the associated sensed trailing vehicle located behind the associated following vehicle and the forward gap distance data representative of the forward gap distance as determined by the associated third vehicle between the associated following vehicle and the associated third vehicle; and selectively determine the associated sensed trailing vehicle located behind the associated following vehicle as being the at least one non-platoon vehicle based on the determined magnitude of the difference between the rearward distance data and the forward gap distance data.

9. The system according to claim 8, wherein the logic of the platoon control unit is executable by the processor to determine the associated sensed trailing vehicle located behind the associated following vehicle as being the at least one non-platoon vehicle based on a comparison between:

the magnitude of the difference between the rearward distance data and the forward gap distance data.

10. The system according to claim 8, wherein the platoon control unit selectively generates a platoon discontinue signal based on determining the associated sensed trailing vehicle located behind the associated following vehicle as being the at least one non-platoon vehicle, the platoon discontinue signal being transmitted by the platoon control unit to a platoon management system of the associated following vehicle to manage the platoon by discontinuing participation by the associated following vehicle in the platoon responsive to the platoon management system of the associated following vehicle receiving the platoon discontinue signal.

11. The system according to claim 8, wherein:

the logic of the platoon control unit is executable by the processor to determine the associated sensed trailing vehicle located behind the associated following vehicle as being the associated third vehicle located rearward of the associated following vehicle based on a correspondence between the rearward distance data and the forward gap distance data.

12. The system according to claim 11, wherein:

the platoon control unit selectively generates a platoon continue signal based on determining the associated sensed trailing vehicle located behind the associated following vehicle as being the associated third vehicle located rearward of the associated following vehicle, the platoon continue signal being transmitted by the platoon control unit to a platoon management system of the associated following vehicle to manage the platoon by selectively continuing participation by the associated following vehicle in the platoon responsive to the platoon management system receiving the platoon continue signal.

13. A method of detecting at least one non-platoon vehicle intermediate platooning vehicles comprising a platooning vehicle pair including an associated leading vehicle and an associated following vehicle cooperatively travelling as a platoon, the method comprising:

providing a platoon control unit configured to be disposed in the associated following vehicle of the platooning vehicle pair, the platoon control unit comprising a processor, a non-transient memory device operatively coupled with the processor, logic stored in the non-transient memory and executable by the processor to determine the at least one non-platoon vehicle intermediate the platooning vehicle pair, a forward distance sensor, a rearward distance sensor, a receiver, and a transmitter;

using the forward distance sensor on the associated following vehicle and operatively coupled with the platoon control unit:

sensing a forward distance between the associated following vehicle of the platooning vehicle pair and an associated sensed forward vehicle located ahead of the associated following vehicle; and generating forward distance data representative of the sensed forward distance between the associated following vehicle and the associated sensed forward vehicle located ahead of the associated following vehicle;

using the receiver operatively coupled with the platoon control unit:
receiving a rearward gap distance signal from the associated leading vehicle of the platooning vehicle pair; and
converting the rearward gap distance signal into rearward gap data representative of a rearward gap distance as determined by the associated leading vehicle between the associated leading vehicle and an associated sensed rearward vehicle located behind the associated leading vehicle;

executing the logic of the platoon control unit by the processor to determine a magnitude of a difference between the forward distance data and the rearward gap data; and executing the logic of the platoon control unit by the processor to selectively determine the associated sensed forward vehicle located ahead of the associated following vehicle and the associated sensed rearward vehicle located behind the associated leading vehicle as being the at least one non-platoon vehicle intermediate the platooning vehicle pair based on the determined magnitude of the difference between the forward distance data and the rearward gap data.

14. The method according to claim 13, further comprising executing the logic of the platoon control unit by the processor to selectively determine the associated sensed forward vehicle located ahead of the associated following vehicle and the associated sensed rearward vehicle located behind the associated leading vehicle as being the at least one non-platoon vehicle based on a comparison between:
the magnitude of the difference between the forward distance data and the rearward gap data and
a predetermined calibration threshold value stored as calibration threshold data in the non-transient memory device of the platoon control unit.

15. The method according to claim 13, further comprising:
selectively generating by the platoon control unit a platoon discontinue signal based on determining the associated sensed forward vehicle located ahead of the associated following vehicle and the associated sensed rearward vehicle located behind the associated leading vehicle as being the at least one non-platoon vehicle intermediate the platooning vehicle pair, the platoon discontinue signal being transmitted by the platoon control unit to a platoon management system of the associated following vehicle to manage the platoon by discontinuing participation by the associated following vehicle in the platoon responsive to the platoon management system receiving the platoon discontinue signal.

16. The method according to claim 13, further comprising:
executing the logic of the platoon control unit by the processor to determine the associated sensed forward vehicle located ahead of the associated following vehicle as being the associated leading vehicle and the associated sensed rearward vehicle located behind the associated leading vehicle as being the associated following vehicle based on a correspondence between the forward distance data and the rearward gap data.

17. The method according to claim 13, further comprising:

using the rearward distance sensor on the associated following vehicle and operatively coupled with the platoon control unit:
sensing a rearward distance between the associated following vehicle of the platooning vehicle pair and an associated sensed trailing vehicle located behind the associated following vehicle of the platooning vehicle pair; and
generating rearward distance data representative of the sensed rearward distance between the associated following vehicle of the platooning vehicle pair and the associated sensed trailing vehicle located behind the associated following vehicle of the platooning vehicle pair; and using the transmitter operatively coupled with the platoon control unit:
converting the rearward distance data into a rearward distance signal; and
transmitting the rearward distance signal from the associated following vehicle of the platooning vehicle pair.

18. The method according to claim 13, further comprising:
using the rearward distance sensor on the associated following vehicle and operatively coupled with the platoon control unit:
sensing a rearward distance between the associated following vehicle of the platooning vehicle pair and an associated sensed trailing vehicle located behind the associated following vehicle of the platooning vehicle pair; and
generating rearward distance data representative of the sensed rearward distance between the associated following vehicle of the platooning vehicle pair and the associated sensed trailing vehicle located behind the associated following vehicle of the platooning vehicle pair.

19. The method according to claim 18, further comprising:
using the receiver:
receiving a forward gap distance signal from an associated third vehicle of the platooning vehicles comprising the associated leading and following vehicles, and the associated third vehicle cooperatively travelling as the platoon, the associated third vehicle of the platooning vehicles being located rearward of the associated following vehicle; and
converting the forward gap distance signal into forward gap distance data representative of a forward gap distance as determined by the associated third vehicle between the associated following vehicle and the associated third vehicle located rearward of the associated following vehicle; and executing the logic of the platoon control unit by the processor:
determining a magnitude of a difference between the rearward distance data representative of the sensed rearward distance between the associated following vehicle of the platooning vehicles and the associated sensed trailing vehicle located behind the associated following vehicle and the forward gap distance data representative of the forward gap distance as determined by the associated third vehicle between the associated following vehicle and the associated third vehicle; and
selectively determining the associated sensed trailing vehicle located behind the associated following vehicle as being the at least one non-platoon vehicle based on the determined magnitude of the difference between the rearward distance data and the forward gap distance data.

20. The method according to claim 19, further comprising executing the logic of the platoon control by the processor to determine the associated sensed trailing vehicle located behind the associated following vehicle as being the at least one non-platoon vehicle based on a comparison between:

the magnitude of the difference between the rearward distance data and the forward gap distance data.

* * * * *